United States Patent [19]
Dolzhenkov et al.

[11] 4,355,789
[45] Oct. 26, 1982

[54] GAS PUMP FOR STIRRING MOLTEN METAL

[76] Inventors: Boris S. Dolzhenkov, ulitsa Aerodromnaya, 87-2; Vladimir F. Andreev, ulitsa Volskaya, 21-6, both of Kuibyshev; Vitalii A. Pimenov, ulitsa Timiryazeva, 65V-1, Kuibyshevskaya oblast, Syzran, all of U.S.S.R.

[21] Appl. No.: 229,579
[22] PCT Filed: May 15, 1979
[86] PCT No.: PCT/SU79/00026
§ 371 Date: Jan. 15, 1981
§ 102(e) Date: Jan. 7, 1981
[87] PCT Pub. No.: WO80/02586
PCT Pub. Date: Nov. 27, 1980

[51] Int. Cl.$^3$ .............................. C22B 9/04; F04F 7/00
[52] U.S. Cl. ..................................... 266/207; 266/218; 266/233; 266/901; 75/65 R; 75/68 R
[58] Field of Search ............... 266/233, 207, 218, 901; 75/68 R, 65

[56] References Cited
U.S. PATENT DOCUMENTS 3,015,190  1/1962  Arbeit ................................. 266/233
3,759,635  9/1973  Carter et al. ......................... 75/68 R
4,008,884  2/1977  Fitzpatrick ........................... 266/233

Primary Examiner—M. J. Andrews
Attorney, Agent, or Firm—Steinberg & Raskin

[57] ABSTRACT

This invention proposes a gas pump for use in metallurgical industry.

The gas pump for stirring a molten metal (1) in a melting chamber (2) comprises a refractory-lined pipe (3) with a removable cover (5) formed with an opening (6) adapted to communicate an inner passage (4) of the pipe (3) with a compressed gas supply system (7) and with a vacuum system (8). The upper wall of the lower portion (11) of the pipe (3) is made thicker and is formed with at least one auxiliary duct (11) brought in communication with the inner passage (4) of the pipe (3) through a tangential inlet (9) having its outlet portion directed along the flow of metal at the moment of its expulsion from the pipe (3).

3 Claims, 2 Drawing Figures

GAS PUMP FOR STIRRING MOLTEN METAL

FIELD OF THE INVENTION

The present invention relates to metallurgy and more particularly to apparatus, namely, gas pumps, for stirring molten metal directly in a furnace where the metal is melted, such stirring being advantageously effected to enhance the rate of melting or to maintain uniformity of composition or temperature in a standing body of molten metal.

BACKGROUND OF THE INVENTION

A variety of devices have been used for stirring molten metal directly in the bath of a melting furnace. This invention proposes a gas pump for stirring molten metals, such as aluminium alloys, which is both effective and simple to carry out.

There is known a gas pump for stirring molten metal, which comprises a refractory-lined pipe provided with a removable cover through which the interior passage of the latter is brought in communication with a compressed gas line and with a vacuum line. The gas pump of this type is usually equipped with metal level detectors incorporated in the compressed gas pulse and vacuum control ciruit.

In the above-described gas pump use is made of the pulse energy of compressed gas applied to a standing body or portion of molten metal periodically withdrawn upwardly into the pipe interior under suction and then expelled therefrom under the action of compressed gas into the bath of a melting furnace. The expelled portion of metal is caused to move in the body of molten metal, entraining the adjacent layers thereof and thus stirring the melt. Then, another portion of molten metal is drawn in the pipe under suction and the operating cycle is resumed in the same order.

Although the prior-art gas pump makes it possible to increase production efficiency of a melting furnace, it has a number of serious disadvantages. For example, a portion of molten metal withdrawn from the bath into the pipe interior is taken from the same place in the bath and expelled into the zone practically adjacent thereto. As a result, the heat and mass exchange in the bath between the upper and lower layers of metal is insufficient, especially where large-capacity melting units are used with a considerable depth of the bath wherein the difference in temperature between the layers of metal is considerable. In a case like this, the process efficiency is normally achieved by increasing the speed at which molten metal is discharged from the pump. This, however, is associated with a further increase in the coefficient of energy transfer from compressed gas to molten metal, which is also limited by the excessive gas and slag formation at the gas-metal interface. This factor is another obstacle to obtaining a desired effect in stirring. An increase in the number of pumps at a melting furnace is no solution to the problem either. On the contrary, this will only complicate its operation and construction, and will lead to an excessive consumption of gas.

It should be observed that the intensity of the heat and mass exchange between the upper hot and lower cold layers of metal in the furnace bath has direct effect on the rate of melting, the quality of metal produced, and the consumption of fuel. The rate of heat and mass exchange in the furnace bath can be stepped up by causing molten metal to flow in the vertical direction. However, this task is impossible to carry out with the existing constructions of gas pumps. From the above it follows that the gas pumps currently used for stirring of molten metal suffer from a number of disadvantages which, if obviated, will allow effective stirring of molten metal to be achieved in the course of melting operation performed in the furnace bath.

It is undisputable fact that the economy of energy is one of the most important problems confronting modern industry to-day. Therefore, a further increase in the production capacity of metallurgical units by providing favourable conditions for complete and rapid heat and mass exchange process will be a substantial contribution to the solution of this problem. And the advantages accruing therefrom are many. Apart from substantial savings in fuel it also becomes feasible to improve the quality of alloys intended for further use in the manufacture of special-purpose parts and units, for example, in the aircraft industry.

It is therefore an object of the present invention to obviate the above disadvantages.

What is desired is a gas pump for stirring molten metal, wherein a stirrer pipe will be constructed so as to permit the production capacity of melting furnaces to be enhanced, the quality of metal to be improved, and the saving in fuel to be gained as a result of more complete heat and mass exchange between the upper and lower layers of metal in the bath of a furnace.

This invention provides a gas pump for stirring molten metal in a container, comprising a refractory-lined pipe with a removable cover formed with an opening provided to communicate the pipe interior with a compressed gas supply system and with a vacuum system, wherein the upper wall of the pipe lower portion is made thicker and is formed with at least one auxiliary duct brought in communication with the pipe interior through a tangential inlet having its outlet portion directed along the flow of metal discharged from the pipe.

Such pump construction makes it possible to produce circular motion of metal in the vertical direction, whereby the upper overheated layers of metal are mixed with the lower underheated layers thereof to enable intensive stirring of metal in the bath with the resultant uniformity of temperature to be established throughout the volume of the metal bath. The provision of the tangential inlet in the auxiliary duct, whose outlet portion is directed along the flow of metal at the moment of its expulsion, permits the jet effect to be advantageously utilized for drawing in upper layers of metal from the bath, passing through the auxiliary duct into the pipe interior so as to be mixed therein with lower layers of metal before being discharged into the bath.

The lower thickened portion of the stirrer pipe is preferably made in the form of a detachable nozzle.

This will facilitate the manufacture of a gas pump and the removal of slags from passages in the course of operation.

The auxiliary ducts formed in the pipe wall are preferably arranged at different levels relative to one another and above the outlet portion of the pipe.

With such pump construction it will become feasible to increase the area of effective stirring of molten metal. This is especially important in cases when a gas pump is incorporated in large-capacity melting furnaces with a bath of substantial depth.

The invention will be further described, by way of example only, with reference to the accompanying drawings, in which.

Arrows are used to indicate the direction of metal flow at the moment of the metal-expelling stage.

H is the value denoting the change in the level of metal within the pipe interior in the course of the pump operation.

Best Mode of Carrying out the Invention

Figure 2:
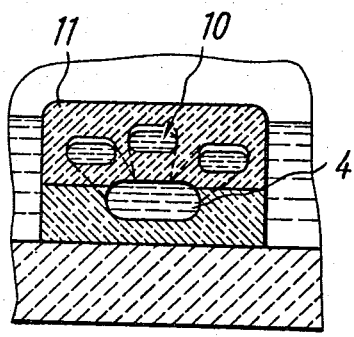
FIG. 2 is a cross-section II—II of FIG. 1.

The gas pump according to the invention for stirring a molten metal 1 in a melting chamber 2 of a furnace comprises a refractory-lined pipe 3 having an inner passage 4 and a removable cover 5. The inner passage 4 is brought in communication through an opening 6, formed in the wall of the pipe 3, with a compressed gas supply system 7 and with a vacuum system 8. The control circuit diagram of these systems is not shown as it has no substantial difference from that used in any conventional pump of a similar type. The pipe 3 has its inner passage 4 brought in communication through a tangential inlet 9 with an auxiliary intake duct 10 disposed above the outlet portion of the tangential inlet 9 directed along the flow of metal at the moment of its expulsion. It is possible to provide a plurality of auxilliary intake ducts 10 and to have them arranged at different levels above the outlet portion of the inner passage 4 of the pipe 3. The pump pipe 3 has a wall whose lower thicker portion is formed as a detachable nozzle 11, such as shown in FIG. 2, and which is formed with the auxiliary ducts 10. Such pump construction, made up from separate units, simplifies its manufacture and facilitates the cleaning of the ducts 10 and of the pipe inner passage 4 in the course of operation. Another embodiment of arranging each individual duct 10 in a separate detachable nozzle is possible.

The pump operates in the following manner.

Figure 1:
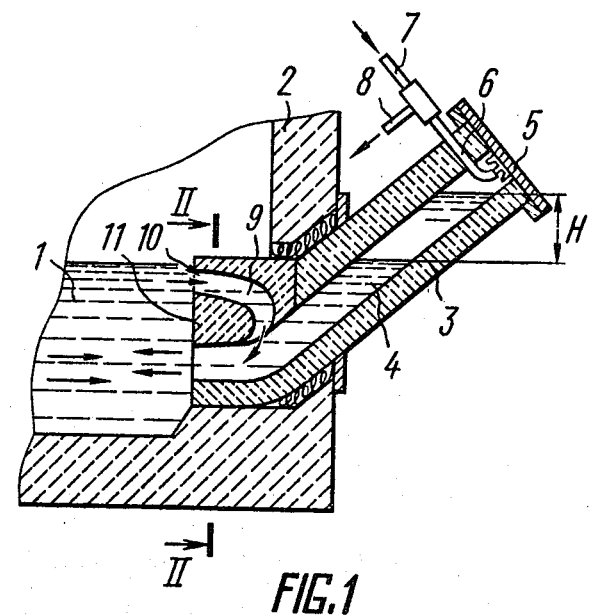
FIG. 1 shows a gas pump and a part of a furnace viewed in the vertical along the longitudinal axis.

When the bath of the molten metal 1 (FIG. 1) achieves a permissible level in the melting chamber 2, so that the metal covers the tangential inlet 9 of the duct 10, communicating the latter with the pipe inner passage 4, the vacuum system 8 is brought in operation.

Under suction, the molten metal is drawn in the pipe 3 to a maximum height H, whereupon a corresponding detector (not shown) is operated to actuate the compressed gas supply system 7. The pulse of gas under pressure is applied to the portion of molten metal in the pipe 3 and thus forcefully expels it therefrom into the melting chamber 2. At the same time, the metal is displaced in the inner passage 4 of the pipe 3, entraining a portion of metal from the auxiliary ducts 10. Thereafter, this portion of metal is mixed with that in the inner passage 4 to be discharged together into the melting chamber 2.

The operation of the gas pump according to the invention is based on the so-called jet effect, i.e. one jet entrains the other one as a result of friction between the layers of molten metal. The higher the travelling speed of metal in the inner passage 4, the greater is the portion of metal withdrawn through the auxiliary duct 10 from upper layers of the melt in the melting chamber 2. Here the metal is caused to perform circular motion in the vertical with the result that heat and mass exchange between the upper and lower layers of metal in the melting chamber 2 is greatly intensified. Then, a new portion of molten metal is drawn in the pipe 3 and the operating cycle is resumed in the same order until the temperature is made uniform in the entire volume of the bath in the melting chamber 2.

Commercial Applicability

The gas pump has been tested to shown high effectiveness in stirring, enabling the time for stirring operation to be reduced by 10 to 15 percent as compared with conventional gas pumps.

The gas pump of the invention is recommended for use in melting furnaces and vacuum plants with a view to increasing their production efficiency, improving the quality of metal, and reducing specific consumption of fuel.

We claim:

1. A melting furnace including a melting chamber at least partially defined by a side wall and a gas pump for stirring molten metal situated within said melting chamber, said gas pump comprising a refractory-lined pipe with a removable cover formed with an opening adapted to communicate the pipe interior with a compressed gas supply system and with a vacuum system, said pipe extending through said melting chamber side wall in a generally downward direction from an upper portion located outside of said melting chamber to a lower portion located within said melting chamber, said pipe having an inner passage opening at an outlet portion into the interior of said melting chamber, said lower portion of said pipe having a thicker upper wall in which is formed at least one auxiliary duct opening into the interior of said melting chamber at a location above said outlet portion of said pipe inner passage and which communicates with said inner passage of the pipe through an inlet substantially tangential thereto and having its outlet portion directed along the flow of metal at the moment of its expulsion from the inner passage of the pipe.

2. A furnace as claimed in claim 1, wherein said lower thickened portion of the pipe in which said at least one auxiliary duct is formed is constituted by a detachable nozzle.

3. A furnace as claimed in claim 1, wherein said at least one auxiliary duct includes a plurality of auxiliary ducts and wherein said ducts open into the interior of said melting chamber at locations which are arranged at different levels relative to one another and above the outlet portion of the inner passage of the pipe.

* * * * *